United States Patent
Trivelpiece et al.

(10) Patent No.: US 10,386,841 B2
(45) Date of Patent: Aug. 20, 2019

(54) SYSTEMS AND METHODS FOR MITIGATING UNUSUAL BEHAVIOR USING UNMANNED MOBILE MACHINES

(71) Applicants: Steve E. Trivelpiece, Rancho Santa Margarita, CA (US); Craig E. Trivelpiece, Mission Viejo, CA (US); Hubert A. Patterson, Boca Raton, FL (US)

(72) Inventors: Steve E. Trivelpiece, Rancho Santa Margarita, CA (US); Craig E. Trivelpiece, Mission Viejo, CA (US); Hubert A. Patterson, Boca Raton, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 60 days.

(21) Appl. No.: 15/596,153

(22) Filed: May 16, 2017

(65) Prior Publication Data

US 2018/0335778 A1 Nov. 22, 2018

(51) Int. Cl.
| | |
|---|---|
| *G05D 1/00* | (2006.01) |
| *G05D 1/10* | (2006.01) |
| *G05D 1/02* | (2006.01) |
| *B64C 39/02* | (2006.01) |
| *B64D 7/00* | (2006.01) |
| *F41H 9/04* | (2006.01) |
| *F41H 13/00* | (2006.01) |
| *G06K 9/32* | (2006.01) |
| *F41H 11/00* | (2006.01) |

(Continued)

(52) U.S. Cl.
CPC ........ *G05D 1/0094* (2013.01); *B64C 39/024* (2013.01); *B64D 7/00* (2013.01); *F41H 9/04* (2013.01); *F41H 11/00* (2013.01); *F41H 13/0012* (2013.01); *G05D 1/0202* (2013.01); *G05D 1/0212* (2013.01); *G05D 1/101* (2013.01); *G06K 9/00771* (2013.01); *G06K 9/3258* (2013.01); *G08B 13/2462* (2013.01); *G08B 25/10* (2013.01); *B64C 2201/12* (2013.01); *G05D 2201/0209* (2013.01); *G06Q 30/0609* (2013.01); *G08B 3/00* (2013.01)

(58) Field of Classification Search
CPC .................................................. G05D 1/0094
See application file for complete search history.

(56) References Cited

U.S. PATENT DOCUMENTS

| | | | |
|---|---|---|---|
| 2017/0038781 A1* | 2/2017 | Querejeta Masaveu | ..................... B64C 39/024 |
| 2017/0115667 A1* | 4/2017 | Marr | ..................... B64C 39/024 |

(Continued)

*Primary Examiner* — Alex C Dunn
(74) *Attorney, Agent, or Firm* — Fox Rothschild LLP; Robert J. Sacco; Carol E. Thorstad-Forsyth (57) ABSTRACT

Systems and methods for operating an Unmanned Mobile Machine ("UMM"). The methods comprise: detecting, by a Loss Prevention System ("LPS"), an unusual activity by at least one individual in a facility; communicating a signal from the loss prevention system to the UMM, in response to the detection of the unusual activity; transitioning an operational state of the UMM from a first state in which at least mitigation operations are disabled to a second state in which the mitigation operations are enabled, in response to the signal's reception at the UMM; and performing the mitigation operations by the UMM to visibly follow an individual associated with the unusual activity.

27 Claims, 5 Drawing Sheets

(51) Int. Cl.
  *G06K 9/00* (2006.01)
  *G08B 13/24* (2006.01)
  *G08B 25/10* (2006.01)
  *G06Q 30/06* (2012.01)
  *G08B 3/00* (2006.01)

(56) References Cited

U.S. PATENT DOCUMENTS

| | | |
|---|---|---|
| 2017/0225336 A1* | 8/2017 | Deyle .................... B25J 13/086 |
| 2017/0225802 A1* | 8/2017 | Lussier .................... B64F 1/00 |
| 2017/0275024 A1* | 9/2017 | Bennett .................... B64F 5/30 |
| 2018/0150087 A1* | 5/2018 | Enos ........................ H04L 67/12 |
| 2018/0233007 A1* | 8/2018 | Williams .............. B64C 39/024 |

* cited by examiner

SYSTEMS AND METHODS FOR MITIGATING UNUSUAL BEHAVIOR USING UNMANNED MOBILE MACHINES

BACKGROUND

Statement of the Technical Field

The present disclosure relates generally to systems and methods for unusual behavior (e.g., crime) mitigation. More particularly, the present disclosure relates to implementing systems and methods for mitigating unusual behavior using unmanned mobile machines (e.g., drones and/or robots).

Description of the Related Art

Theft in the retail sector is a major cost. A great deal of money and effort is spent on preventing and tracking retail theft. A lot of effort is also made to enhance the psychology of the perception of likelihood of being caught or stopped for actually preventing attempts at theft. One of the problems is that bold thieves know that most retailers have policies that prohibit employees from physically stopping, confronting or even following obvious thieves. The concern behind this policy is endangering customers and employees, insurance costs and bad publicity for the company when violence occurs from a confrontation.

There are now loss detection systems that track inventory, alarm at the door or know when items are removed from the store. Some will alert guards at the door but they don't do anything for liability reasons. Some systems take a few pictures of suspect but the theft happens and there is little follow-up or deterrent.

SUMMARY

The present document concerns implementing systems and methods for operating an Unmanned Mobile Machine ("UMM"). The methods comprise: detecting, by a Loss Prevention System ("LPS"), an unusual activity by at least one individual in a facility; communicating a signal from the loss prevention system to the UMM, in response to the detection of the unusual activity; transitioning an operational state of the UMM from a first state in which at least mitigation operations are disabled to a second state in which the mitigation operations are enabled, in response to the signal's reception at the UMM; and performing the mitigation operations by the UMM to visibly follow an individual associated with the unusual activity. The unusual activity can include, but is not limited to, unauthorized activity or criminal activity.

In some scenarios, the LPS comprises at least one of an Electronic Article Surveillance ("EAS") system, a Radio Frequency Identification ("RFID") system, and a surveillance system. The UMM is an Unmanned Ground Vehicle ("UGV") or an Unmanned Aerial Vehicle ("UAV").

In those or other scenarios, the UMM receives information sent from the LPS that is useful for identifying the individual associated with the unusual activity. The information includes, but is not limited to, a security tag identifier. The UMM uses the security tag identifier to identify the individual as the individual leaves the facility.

In those or other scenarios, the UMM performs operations to capture at least one of an image of a vehicle associated with the individual or an image of the vehicle's license plate. The UMM may also: output speech or sound to (A) inform the individual that the individual is suspected of performing the unusual activity or (B) request that the individual return to the facility; and/or project a 2D image or 3D hologram towards the individual. The UMM may further: communicate information to security personnel or law enforcement officials which identifies the individual or vehicle which is being followed thereby; couple a tracking device to a vehicle or object associated with the individual; and/or use a non-lethal weapon to mitigate the unusual activity.

BRIEF DESCRIPTION OF THE DRAWINGS

Embodiments will be described with reference to the following drawing figures, in which like numerals represent like items throughout the figures.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution generally concerns system and methods for mitigating crime (e.g., theft of merchandise). Crime is mitigated or prevented by using UMMs (such as Unmanned Ground Vehicles ("UGVs") and Unmanned Aerial Vehicles ("UAMs")) to collect and report information (e.g., vehicle information or personal device information) about people associated with unusual behavior (e.g., a potential crime or detection of car alarm/panic button activation through sound and flashing light detection) that is useful in deterring, preventing or proving certain activities (e.g., criminal activities). The UMMs are disposed outside a facility (e.g., a retail store) and activated when unusual activity is detected by a Loss Prevention System ("LPS") disposed within the facility. For example, the UMMS can investigate the unusual behavior and provide a deterrent for merchandise theft, car theft, burglary and/or assault.

The present solution will be described herein in relation to retail applications. The present solution is not limited in this regard. Other applications in which the present solution can be employed are commercial applications, industrial applications, warehouse applications, law enforcement applications, and/or educational applications.

Figure 1:
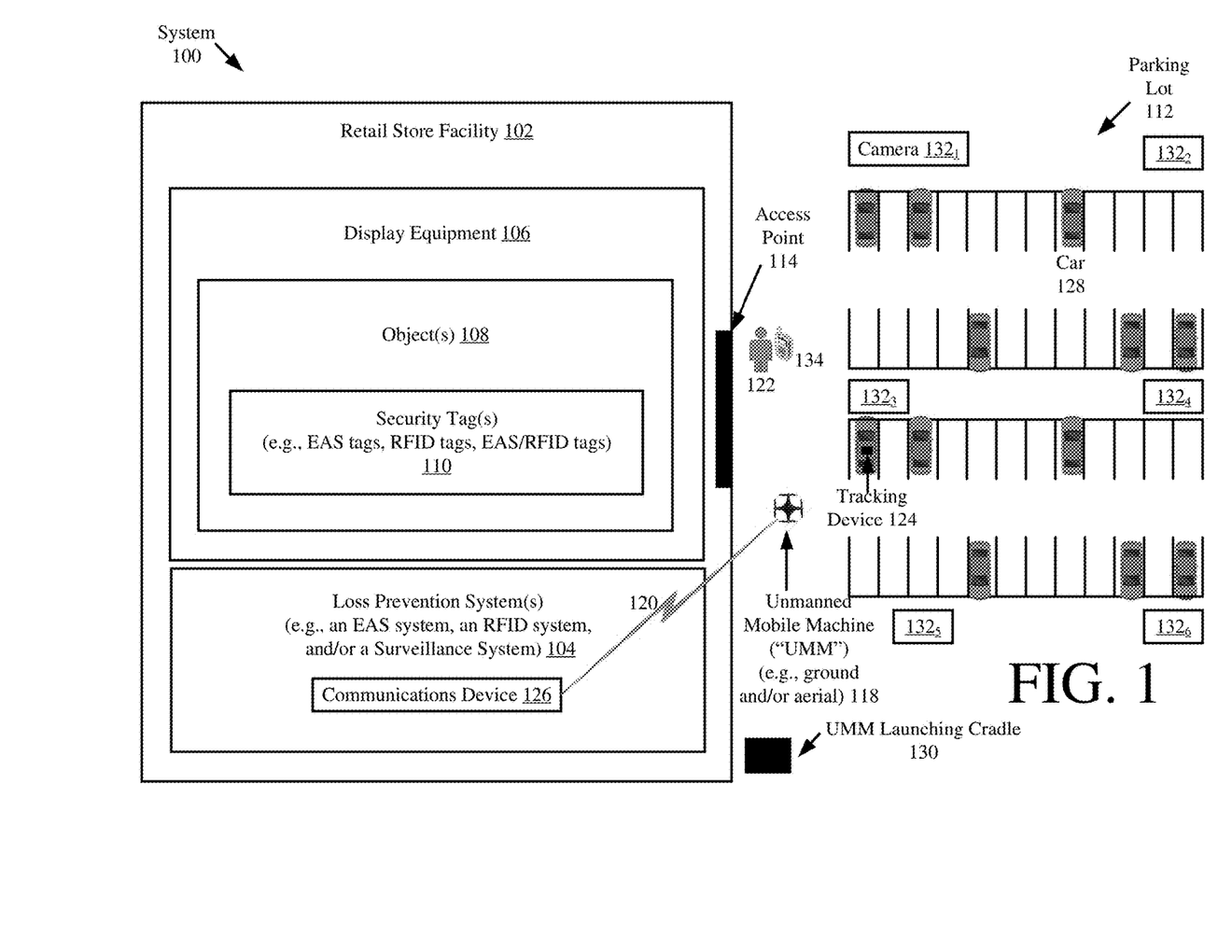
FIG. 1 provides an illustration of an exemplary architecture for a system.

Referring now to FIG. 1, there is provided an illustration of an exemplary system 100. System 100 is generally configured to mitigate unusual behavior (e.g., crimes or other unauthorized activities) using UMM(s) 118. The UMM(s) 118 include(s), but is(are) not limited to, a UGV and/or a UAV. UGVs and UAVs are well known in the art, and therefore will not be described in detail herein. An exemplary architecture for a UMM is described below in relation to FIG. 3 for purposes of assisting a reader in understanding the present solution. Any known or to be known UGV and/or UAV can be used herein provided that it is programmed to implement all or a portion of the methods described herein.

As shown in FIG. 1, a UMM launching cradle 130 is disposed outside of a Retail Store Facility ("RSF") 102 at a strategic location. For example, the UMM launching cradle 130 is placed in proximity to an access point (e.g., doorway) 114 thereof. The UMM launching cradle 130 provides a place where the UMM rests during times of deactivation, rest states, power saving modes, and/or battery recharging. Notably, the presence of such a UMM 118 and/or UMM launching cradle 130 provides a deterrent for unusual activity (e.g., criminal activity such as theft of retail merchandise).

During operation, the UMM 118 is activated when an LPS 104 of the RSF 102 detects unusual activity (e.g., theft of an object 108 disposed on display equipment 106 inside the RSF 102). LPS 104 includes, but is not limited to, an Electronic Article Surveillance ("EAS") system, a Radio Frequency Identification ("RFID") system, and/or surveillance system. EAS, RFID and surveillance systems are well known in the art, and therefore will not be described herein. Any known or to be known EAS, RFID and/or surveillance system can be used herein without limitation. In all cases, the LPS 104 includes a communication device 126 configured to communicate information to and from the UMM 118 via wireless communications link 120.

The LPS 104 may also be configured to learn and detect patterns of unusual behavior via the use of a machine learning algorithm. Machine learning algorithms are well known in the art, and therefore will not be described herein. Any known or to be known machine learning algorithm can be used herein without limitation. For example, the LPS can learn over time that certain patterns of human behavior typically result in theft. The present solution is not limited to the particulars of this example.

In EAS and/or RFID applications, the LPS 104 communicates a command to the UMM 118 for activating the same when it detects an active security tag 110 in a surveillance zone provided within the RSF 102 adjacent to the access point 114. In response to this command, the UMM 118 performs operations to: detect when a person 122 associated with unusual activity (e.g., a crime or potential crime) exits the RSF via the access point 114; follow the person through the parking lot 112 as (s)he travels towards his(her) car 128; capture images of the car 128 and the car's license plate; obtain identifying information for a Mobile Communication Device ("MCD") (e.g., a phone number or unique device identifier); and forward the captured images and collected MCD related identifying information to security personnel of the retail store and/or law enforcement officials. The MCD related identifying information can be obtained via a WiFi access point pinging process.

In some scenarios, a plurality of cameras $132_1$, $132_2$, $132_3$, $132_4$, $132_5$ and $132_6$ are strategically placed around the RSF 102. The cameras can include, but are not limited to, visible cameras, Infrared ("IR") cameras, and/or Ultraviolet ("UV") cameras. The images and/or videos captured by the cameras can be used by: security personal and/or law enforcement officials to detect and/or prove criminal activities; and/or the UMM 118 for identifying people associated with a detected unusual activity and tracking movement of such people outside of the RSF 102. Other operations of system 100 will become evident as the discussion progresses.

Figure 2:
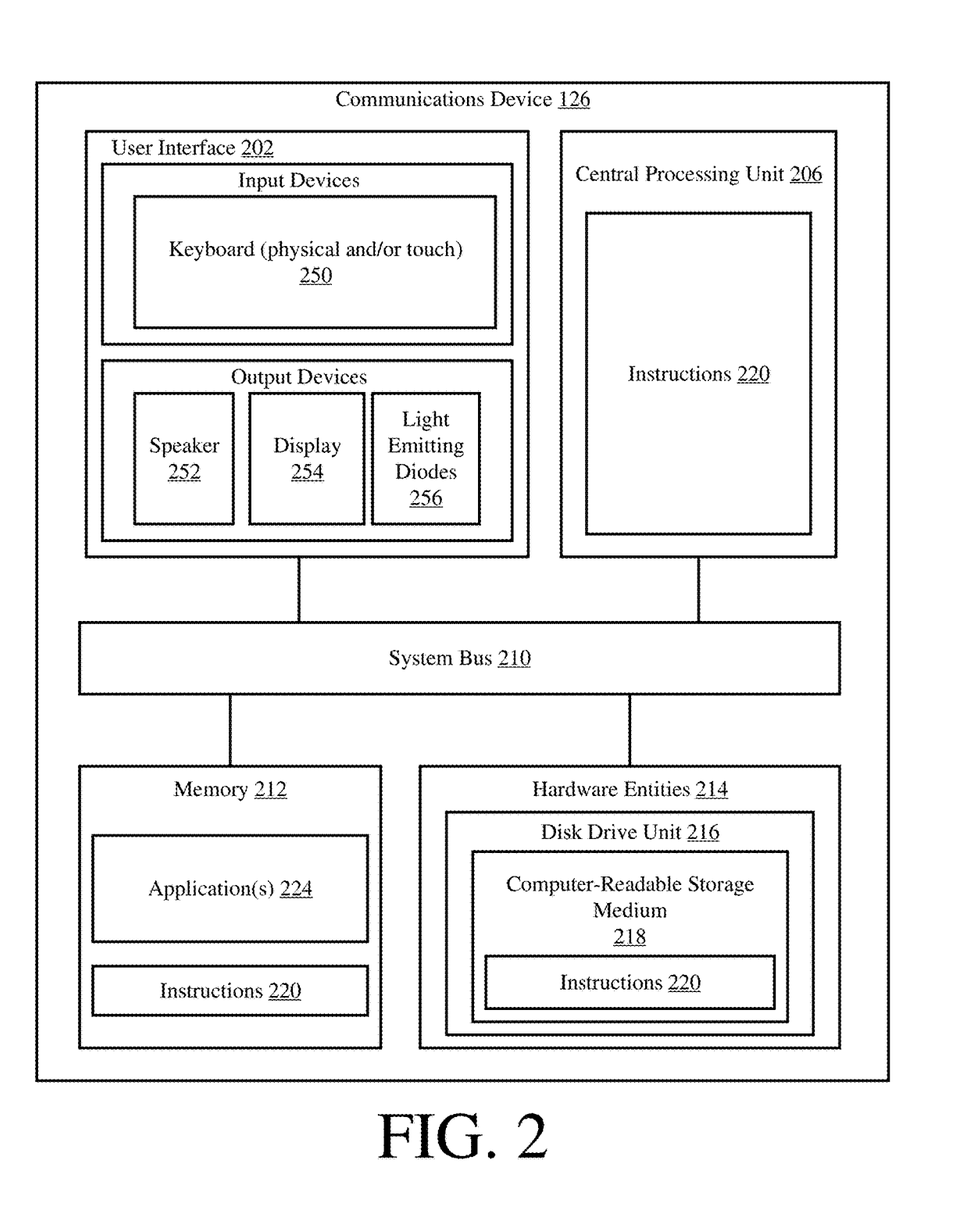
FIG. 2 provides an illustration of an exemplary architecture for the communications device shown in FIG. 1

Referring now to FIG. 2, there is provided a detailed block diagram of an exemplary architecture for the communication device 126. Communication device 126 may include more or less components than those shown in FIG. 2. However, the components shown are sufficient to disclose an illustrative embodiment implementing the present solution. The hardware architecture of FIG. 2 represents one embodiment of a representative communication device configured to facilitate the mitigation of criminal activities. As such, the communication device 126 of FIG. 2 implements at least a portion of a method for deterring, preventing or proving criminal activities. This method involves communicating information between LPS 104 and UMM 118. Some or all components of the server 300 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 2, the communication device 126 comprises a user interface 202, a Central Processing Unit ("CPU") 206, a system bus 210, a memory 212 connected to and accessible by other portions of communication device 126 through system bus 210, and hardware entities 214 connected to system bus 210. The user interface can include input devices (e.g., a keypad 250) and output devices (e.g., speaker 252, a display 254, and/or light emitting diodes 256), which facilitate user-software interactions for controlling operations of the communication device 126.

At least some of the hardware entities 214 perform actions involving access to and use of memory 212, which can be a Random Access Memory ("RAM"), a disk driver and/or a Compact Disc Read Only Memory ("CD-ROM"). Hardware entities 214 can include a disk drive unit 216 comprising a computer-readable storage medium 218 on which is stored one or more sets of instructions 220 (e.g., software code) configured to implement one or more of the methodologies, procedures, or functions described herein. The instructions 220 can also reside, completely or at least partially, within the memory 212 and/or within the CPU 206 during execution thereof by the communication device 126. The memory 212 and the CPU 206 also can constitute machine-readable media. The term "machine-readable media", as used here, refers to a single medium or multiple media (e.g., a centralized or distributed database, and/or associated caches and servers) that store the one or more sets of instructions 220. The term "machine-readable media", as used here, also refers to any medium that is capable of storing, encoding or carrying a set of instructions 220 for execution by the communication device 126 and that cause the communication device 126 to perform any one or more of the methodologies of the present disclosure.

In some scenarios, the hardware entities 214 include an electronic circuit (e.g., a processor) programmed for facilitating the mitigation of unusual activity. The unusual activity includes, but is not limited to, criminal activity and/or unauthorized activity. In this regard, it should be understood that the electronic circuit can access and run application(s) 224 installed on the communication device 126. The software application 224 is generally operative to facilitate: the detection of unusual activity in RSF 102; the activation of UMM 118 when such a detection is made; the communication of information from LPS 104 to UMM 118 that is useful in identifying a person leaving the RSF 102 that is associated with the detected unusual activity; and reception of information from the UMM that is useful in tracking and locating the person after (s)he has left the RSF 102. Other functions of the software application 224 will become apparent as the discussion progresses.

Figure 3:
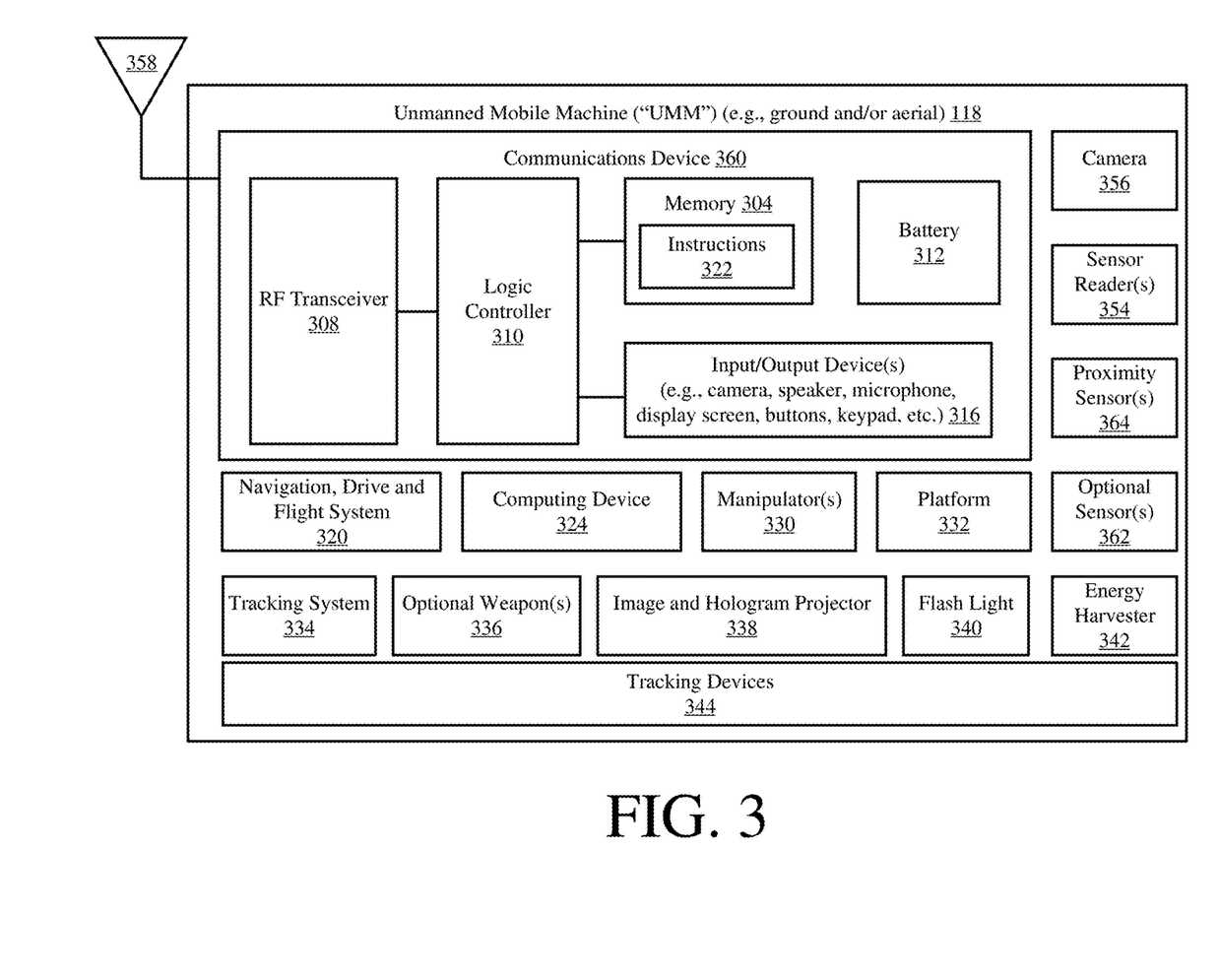
FIG. 3 provides an illustration of an exemplary architecture for an Unmanned Mobile Machine ("UMM") shown in FIG. 1.

Referring now to FIG. 3, there is provided a detailed block diagram of an exemplary architecture for UMM 118 of FIG. 1. UMM 118 may include more or less components that that shown in FIG. 3. However, the components shown are sufficient to disclose an illustrative embodiment implementing the present solution. Some or all of the components of the UMM 118 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 3 represents an exemplary architecture of a representative UMM 118 configured to facilitate improved unusual activity mitigation. In this regard, the UMM 118 comprises a communication device 360 for allowing data to be exchanged with an external device (e.g., LPS 104 and/or cameras $132_1$-$132_6$ of FIG. 1) via a wireless communication technology. The communication technology can include, but is not limited to, cellular technology, Radio Frequency ("RF") technology, Bluetooth technology, and/or WiFi technology. The components 304-316 shown in FIG. 3 may be collectively referred to herein as the communication device 360.

The communication device 360 includes a power source 312. The power source 312 includes, but is not limited to, a battery. The battery may be rechargeable. The battery may be recharged when it rests in the UMM launching cradle 130 of FIG. 1. Alternatively or additionally, the battery is recharged by an energy harvester 342. Energy harvesters are well known in the art, and therefore will not be described herein. Any known or to be known energy harvester can be used herein without limitation. In some scenarios, the energy harvester 342 harvests energy from light, heat, RF fields, and/or magnetic fields.

The communication device 360 comprises an antenna 358 for allowing data to be exchanged with the external device via a wireless communication technology (e.g., RFID technology or other RF based technology). The external device may comprise LPS 104, cameras $132_1$-$132_6$, and/or an MCD 134 of FIG. 1. In this case, the antenna 358 is configured to transmit signals to and received signals from the listed external devices. In this regard, the communication device 360 comprises an RF transceiver 308. RF transceivers are well known in the art, and therefore will not be described herein. However, it should be understood that the RF transceiver 308 receives RF signals including information from a transmitting device, and forwards the same to a logic controller 310 for extracting the information therefrom.

The extracted information can be used to initiate operations of the UMM and/or determine the identity of and/or location of a person associated with detected unusual activity. Accordingly, the logic controller 310 can store the extracted information in memory 304, and execute algorithms using the extracted information. For example, the logic controller 310 can: receive a command from the LPS 104 to initiate or activate mitigation operations thereof; receive information from the LPS 104 that is useful for identifying a person who is leaving the RSF 102 and is associated with a detected unusual activity; cause the UMM 118 to identify the person based on various information (e.g., video, images, personal device related information (e.g., a Media Access Control ("MAC") identifier or phone number), and/or security tag identifiers); cause a tracking system 334 to track the person's movement; cause a Navigation, Drive and Flight ("NDF") system 320 to operate such that the UMM's 118 follows the person through an area outside of the RSF 102; cause camera 356 to capture video and/or images of the person as (s)he travels through the outside area; cause camera 356 to capture video and/or images of a vehicle to which the person travels towards; cause camera 356 to capture video and/or images of the vehicle's license plate; cause the UMM 118 to communicate with the person via auditory and/or visual outputs; and/or cause the UMM 118 to communicate with security personnel and/or law enforcement officials. Camera 356 includes, but is not limited to, a visible camera, an IR camera and/or a UV camera.

In some scenarios, the UMM 118 can then take measures to facilitate a continued tracking of the person while (s)he travels a certain distance from the RSF 102 (e.g., via public streets, highway, etc.) and/or parking lot 112 of the RSF. For example, the UMM 118 may attach a tracking device 344 to the person's vehicle. This attachment can be achieved simply by dropping the tracking device onto the person's vehicle or by using manipulator(s) 330 (e.g., articulating or telescoping arms with grippers) to place the tracking device on the person's vehicle. Robotic manipulators are well known in the art, and therefore will not be described herein. Any known or to be known manipulator can be used herein without limitation. The tracking device 344 can include, but is not limited to, a Global Positioning System ("GPS") tracker. GPS trackers are well known in the art. The tracking device 344 has a coupling means for coupling it to an object (e.g., car 128 of FIG. 1). The coupling means includes, but is not limited to, an adhesive, a magnet, a clamp, and/or a suction cup. The manipulator(s) 330 and/or tracking device 344 can be coupled to or disposed on a platform 332 (or fixed chassis).

The UMM 118 may also comprise at least one sensor reader 354. The sensor reader 354 is generally configured to: receive a command signal from the communication device 360 to read security tags (e.g., security tags 110 of FIG. 1); read security tags to obtain unique identifiers and/or other information therefrom; and communicate the unique identifiers and/or other information to the communication device 360.

The UMM 118 may further comprise at least one proximity sensor 364 (e.g., an acoustic sensor or infrared sensor) and/or other sensor 362. The proximity sensor 364 detects the distance from the UMM 118 to the security tags being read and/or the distance from the UMM 118 to a person (e.g., person 122 of FIG. 1), vehicle (e.g., car 128 of FIG. 1), or other object.

A distance threshold value can be applied to trigger certain operational modes of the UMM 118. For example, the UMM 118 is being used to safely escort an individual to his(her) car 128. A flash light 340 may be used if it is dark out. As the UMM 118 travels with the individual through the parking lot 112, the proximity sensor 364 detects other individuals in proximity thereto. If the distance between the other individuals and the UMM 118 falls below a threshold value, then the UMM 118 may be transitioned into a deterrent mode. In the deterrent mode, the UMM 118 provides active deterrents, passive deterrents, monitoring and/or logging. As a deterrent, the UMM 118 may: start following the other person; output speech or sound warning the other person to stay aware or notifying the other person that security personnel have been or will be notified; and/or project 2D images and/or 3D holograms using an image and Hologram Projector 338 ("IHP"). The UMM 118 may further use non-lethal weapons 336 in the event that circumstances escalate to a point that non-lethal force is necessary to prevent injury to other patrons. The non-lethal weapons include, but are not limited to, pepper spray and/or tasers.

By adding a highly directional antenna 358 to the UMM 118, the UMM is provided with an improved sensor directionality. During operation, the motion of the UMM is modulated so that a fixed sensor 354, 362, 364 is able to effectively scan back and forth.

As noted above, the camera 356 and/or sensors 354, 362, 364 are configured to obtain information about individuals, items, security tags, vehicles, license plates, and/or personal devices (e.g., smart phones, cellular phone, personal digital assistants, etc.). This information is logged in memory 304, and/or communicated to an external datastore (e.g., a remote database). Memory 304 may be a volatile memory and/or a non-volatile memory. For example, the memory 304 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 304 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Instructions 322 are stored in memory for execution by the communication device 360 and that cause the communication device 360 to perform any one or more of the methodologies of the present disclosure. The instructions 322 are generally operative to facilitate the mitigation of unusual activity. Other functions of the communication device 360 will become apparent as the discussion progresses.

As shown in FIG. 2, the UMM 118 also includes a computing device 324. The computing device 324 is generally configured to control operations of the UMM 118. These operations include, but are not limited to, autonomous operations to (a) identify individuals, (b) track movements of individuals, (c) obtain videos and/or images of the individuals and/or objects of interest (e.g., cars, license plates, items, etc.), (d) acquire information related to personal devices in the individual's possession, (e) strategically place tracking devices on objects of interest, (f) communicate with individual's via auditory and/or visual outputs, (g) use non-lethal force against individuals, (h) generate a map or mapping of the individuals and/or strategically placed tracking devices showing their relative positions to a reference location, (i) log information, and/or (j) communicate information to and from security personnel and/or law enforcement officials. The operations can additionally include learning patterns of behavior that indicate a likelihood of unusual behavior (e.g., criminal activity), detecting when such patterns of behavior are being performed by individuals in proximity thereto, and informing an external device when such detection is made.

The computing device 324 can include a desktop computer, a personal computer or any other device capable of processing and storing data. Computing device 324 may be the same as or substantially similar to the communications device 126 shown in FIG. 2. As such, the discussion provided above in relation to FIG. 2 is sufficient for understanding the computing device 324 of the UMM 118.

The UMM 118 also includes a platform 332. The platform 332 is adapted to hold, contain and/or otherwise support tracking devices 344 and/or other items. In some scenarios, the platform 332 comprises a deck or a bed with a single support surface or multiple support surfaces separated by dividers (e.g., bins, shelves or drawers). The tracking devices 344 and/or other items can be placed on or removed from the platform 332 via the manipulator(s) 330. The manipulator(s) 330 are also used to place tracking devices 344 and/or other items at strategic locations within an area of interest and/or on objects of interest. In this regard, the manipulator(s) 330 are generally configured to grasp or otherwise hold the tracking devices 344 and/or other items.

The NDF system 320 of UMM 118 is generally configured to move the UMM 118 within a surrounding environment without coming in contact with obstructions and without tipping over. In this regard, the NDF system 320 includes, but is not limited to, a propulsion system, a drive train, drive wheels, and/or tracks (such as those found on tanks). The NDF system 320 is configured to continuously determine and track the UMM's position and location relative to other objects within a surrounding environment. NDF systems are well known in the art, and therefore will not be described in detail herein. Any known or to be known NDF system can be used herein without limitation. In some scenarios, beacons and/or RFID tags are used by the NDF system 320 to track the UMM's location within a given area. Additionally or alternatively, the NDF system 320 uses other techniques (e.g., triangulation) to track the UMM's location.

The UMM 118 is not limited to the architecture shown in FIG. 3. The UMM may include more or less components as that shown in FIG. 3. For example, the UMM 118 can include Light Detection And Ranging ("LIDAR") devices for further facilitating the generation of accurate relative distance and direction information. LIDAR devices are well known in the art, and therefore will not be described herein. Any known or to be known LIDAR device can be used herein without limitation.

Figure 4A:
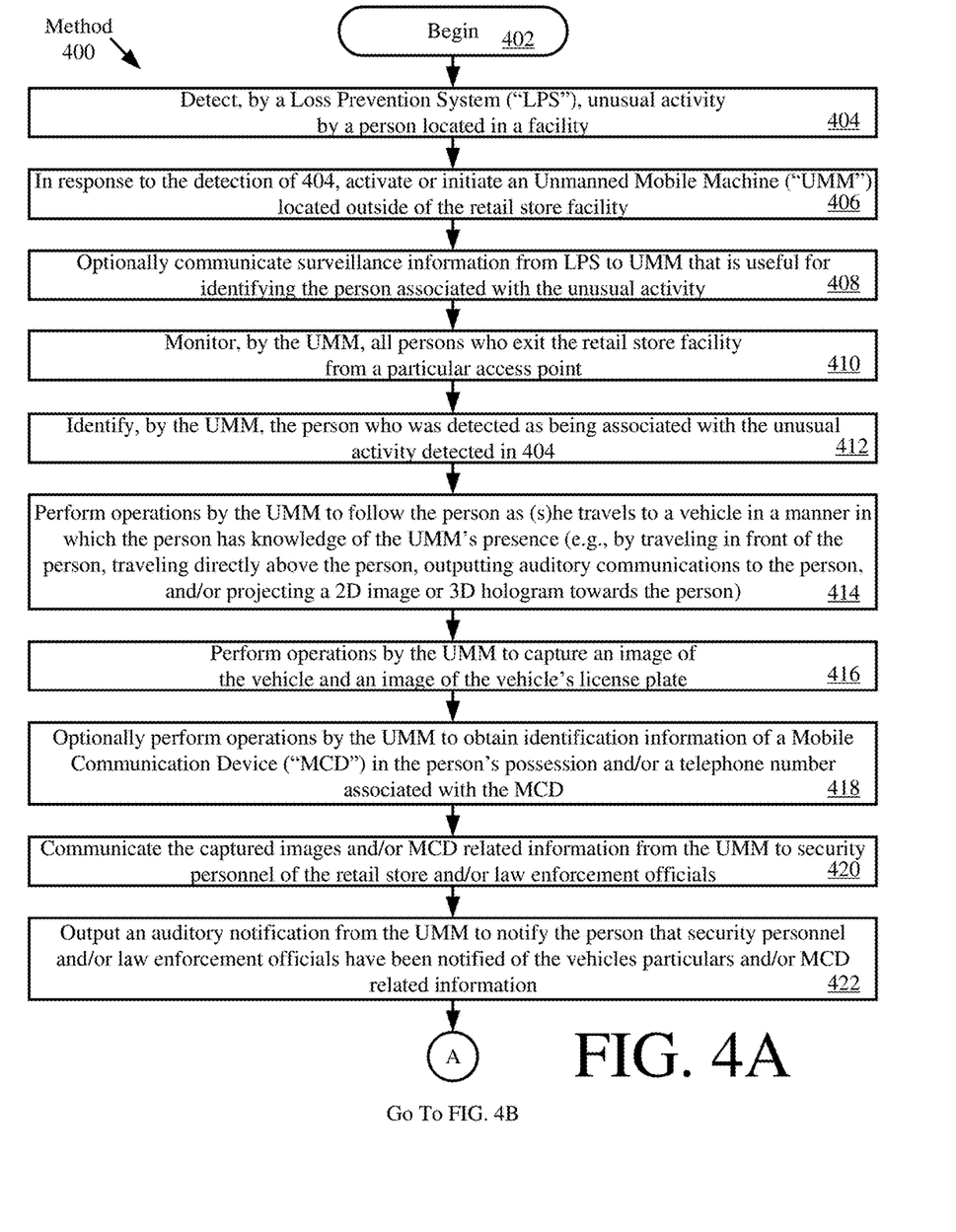
FIGS. 4A-4B (collectively referred to as "FIG. 4") provide a flow diagram of an exemplary method for deterring crime.
Figure 4B:
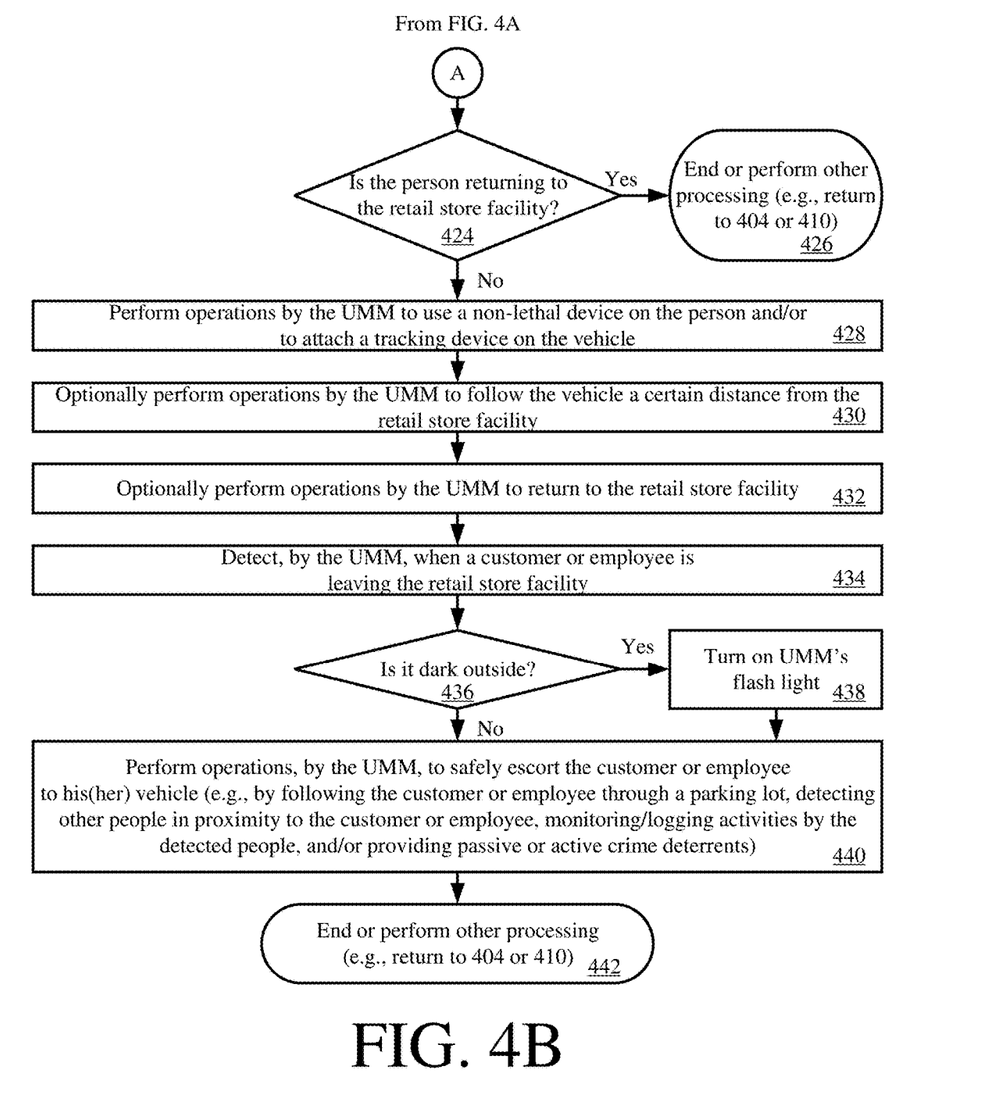

Referring now to FIGS. 4A-4B, there is provided a flow diagram of an exemplary method 400 for mitigating unusual activity. Method 400 begins with 402 and continues with 404 where an LPS (e.g., LPS 104 of FIG. 1) performs operations to detect unusual activity by a person (e.g., person 122 of FIG. 1) located in a facility (e.g., RSF 102 of FIG. 1). This detection can be made based on: results of video/image analysis; facial recognition; and/or detected movement of security tags. In response to the detection of 404, a UMM (e.g., UMM 118 of FIG. 1) is activated or initiated in 406. This activation is achieved by communicating an activation/initiation command from the LPS to the UMM. In response to the activation/initiation command, an operational state of the UMM is transitioned from a first state in which at least mitigation operations are disabled to a second state in which the mitigation operations are enabled. The mitigation operations involve operations to mitigate unusual activity (e.g., identification, surveillance, tracking and/or logging). Notably, the UMM is located outside of the RSF so as to be visible to those entering and exiting the RSF via an access point (e.g., access point 114 of FIG. 1). In some scenarios, the LPS also communicates information to the UMM that is useful for identifying the person associated with the unusual activity, as shown by optional 408. This information includes, but is not limited to, security tag identifier(s), video(s), personal device identifier, and/or images. Video/Image analytics can be used to isolate images of a person associated with the unusual activity. This image can be sent to the UMM for use in 412.

In 410, the UMM monitors all persons who exit the RSF from the access point. This monitoring is performed so that the UMM identifies the person in 412 who was identified in 404 as being associated with an unusual activity. This identification is achieved via image/video analysis, security tag detection/tracking, and/or personal device detection/tracking. In some scenarios, video/image analysis is combined with exit directional theft sensors (e.g., Received Signal Strength Indicator ("RSSI"), sensor location and camera) to best determine the image of the person(s) most likely associated with the detected unusual activity. The UMM uses videos/images captured by its camera (e.g., camera 356 of FIG. 3) to match a person shown in videos/images captured by the exit directional theft sensors. In 412, the UMM may create analytics of motion and behavior through video/image analysis. The analytics are used to help determine and confirm the identity of the person associated with the detected unusual activity. Operations of 410-412 can be performed by the UMM autonomously, manually under human control, or a combination of both.

Once the person has been identified in 412, the UMM performs operations in 414 to follow the person as (s)he travels to a vehicle (e.g., car 128 of FIG. 1) in a manner in which the person has knowledge of the UMM's presence. In some scenarios, the UMM travels in front of the person or directly above the person so that the person has knowledge that (s)he is being monitored, followed and/or photographed. The UMM may also output auditory communications to the person. For example, the UMM can output pre-recorded speech or currently received speech (a) letting the person know that (s)he is suspected of performing an unusual activity (e.g., not paying for retail items 108 of FIG. 1), and/or (b) requesting that the person return to the RSF for resolution of this matter. The UMM may additionally or alternatively output warning sounds (e.g., sirens) and/or project a 2D image or 3D hologram towards the person.

As the UMM follows the person, it captures video and/or images of the person and/or a vehicle to which the person is traveling towards, as shown by 416. An image of the vehicle's license plate may also be captured. The UMM may further perform operations to obtain identification information of an MCD (e.g., MCD 134 of FIG. 1) in the person's possession and/or a telephone number associated with the MCD, as shown by 418. A WiFi detector or other equipment can be used to obtain this MCD related information. WiFi detectors are well known in the art, and therefore will not be described herein.

In 420, the captured video/images and/or MCD related information is sent from the UMM to security personnel and/or law enforcement officials. In some scenarios, 420 is performed when the person refuses to return to the RSF after being requested to do so. An auditory and/or visual notification is provided from the UMM to the person in 422 that security personnel and/or law enforcement officials have been notified of the person's identity, the vehicle's aesthetic details, the vehicle's license plate number, and/or the person's telephone number.

Upon completing 422, method 400 continues with 424 of FIG. 4B. As shown in FIG. 4B, 424 involves determining if the person is returning to the RSF. If the person is returning to the RSF [424:YES], then 426 is performed where method 400 ends or other processing is performed (e.g., method 400 returns to 404 or 410). In contrast, if the person is not returning to the RSF [424:NO], then 428 is performed where the UMM uses a non-lethal device (e.g., weapon 336 of FIG. 3) on the person and/or attaches a tracking device (e.g., tracking device 344 of FIG. 3) on the vehicle. The operations of 428 can be performed autonomously, manually under human control, or a combination of both.

Thereafter, the UMM can optionally perform operations in 430 to follow the vehicle a certain distance from the RSF. The UMM can use video/image analysis and/or security tag sensors to track the vehicle for some distance subject to regulatory and safety limitations. The videos/images used here can be captured by the camera internal to the UMM and/or other camera external to the UMM (e.g., cameras located at street lights). In 432, the UMM returns to the RSF.

Notably, the UMM can also be used to safely escort individual from the RSF to their vehicles. 434-440 describe this process. 434-440 involve: detecting by the UMM when a customer or employee is leaving the RSF; turning on a flash light if it is dark outside; and performing operations by the UMM to safely escort the individual to his(her) vehicle. The safe escort can be provided by following the individual through a parking lot, detecting other people in proximity to the individual, monitoring/logging activities by the detected people, and/or providing passive or active crime deterrents.

Subsequently, 442 is performed where method 400 ends or other processing is performed. (e.g., method 400 returns to 404 or 410).

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating an Unmanned Mobile Machine ("UMM"), comprising:
    detecting, by a Loss Prevention System ("LPS") located inside a facility, an unusual activity by at least one individual in the facility;
    causing an activation of the UMM located outside the facility by wirelessly communicating a signal from the LPS to the UMM, in response to the detection of the unusual activity;
    in response to the signal's reception at the UMM, transitioning an operational state of the UMM from a first state in which at least mitigation operations are disabled to a second state in which the mitigation operations are enabled whereby the UMM is activated; and
    performing the mitigation operations by the UMM to
        visibly follow an individual outside of the facility who is associated with the unusual activity detected inside the facility, and
        coupling a tracking device to an object in the possession of the individual to facilitate a continued tracking of the individual once the individual leaves the facility's premises.

2. The method according to claim 1, wherein the LPS comprises at least one of an Electronic Article Surveillance ("EAS") system, a Radio Frequency Identification ("RFID") system, and a surveillance system.

3. The method according to claim 1, wherein the UMM is an Unmanned Ground Vehicle ("UGV") or an Unmanned Aerial Vehicle ("UAV").

4. The method according to claim 1, further comprising receiving, at the UMM, information sent from the LPS that is useful for identifying the individual associated with the unusual activity.

5. The method according to claim 4, wherein the information comprises a security tag identifier.

6. The method according to claim 5, further comprising using the security tag identifier by the UMM to identify the individual as the individual leaves the facility.

7. The method according to claim 1, further comprising performing operations by the UMM to capture at least one of an image of a vehicle associated with the individual or an image of the vehicle's license plate.

8. The method according to claim 1, further comprising outputting speech or sound from the UMM to (A) inform the individual that the individual is suspected of performing the unusual activity or (B) request that the individual return to the facility.

9. The method according to claim 1, wherein the mitigation operations comprise projecting from the UMM a 2D image or 3D hologram towards the individual.

10. The method according to claim 1, further comprising communicating information from the UMM to security personnel or law enforcement officials which identifies the individual or vehicle which is being followed thereby.

11. The method according to claim 1, wherein the object is a vehicle.

12. The method according to claim 1, further comprising using a non-lethal weapon by the UMM to mitigate the unusual activity.

13. A system, comprising:
    a Loss Prevention System ("LPS") located inside a facility and configured to detect an unusual activity by at least one individual in a facility, and cause an activation of an Unmanned Mobile Machine ("UMM") located outside the facility by wirelessly communicating a signal to the UMM in response to the detection of the unusual activity;
    the UMM configured to
        transition from a first operational state in which at least mitigation operations are disabled to a second operational state in which the mitigation operations are enabled whereby the UMM is activated, in response to the a reception of the signal, and
        perform the mitigation operations to
            visibly follow an individual outside of the facility which is associated with the unusual activity detected inside the facility, and
            coupling a tracking device to an object in the possession of the individual to facilitate a continued tracking of the individual once the individual leaves the facility's premises.

14. The system according to claim 13, wherein the LPS comprises at least one of an Electronic Article Surveillance ("EAS") system, a Radio Frequency Identification ("RFID") system, and a surveillance system.

15. The system according to claim 13, wherein the UMM is an Unmanned Ground Vehicle ("UGV") or an Unmanned Aerial Vehicle ("UAV").

16. The system according to claim 13, wherein the UMM is further configured to receive information sent from the LPS that is useful for identifying the individual associated with the unusual activity.

17. The system according to claim 16, wherein the information comprises a security tag identifier.

18. The system according to claim 17, wherein the security tag identifier is used by the UMM to identify the individual as the individual leaves the facility.

19. The system according to claim 13, wherein the UMM is further configured to capture at least one of an image of a vehicle associated with the individual or an image of the vehicle's license plate.

20. The system according to claim 13, wherein the UMM is further configured to output speech or sound to (A) inform the individual that the individual is suspected of performing the unusual activity or (B) request that the individual return to the facility.

21. The system according to claim 13, wherein the mitigation operations further comprise projecting from the UMM a 2D image or 3D hologram towards the individual.

22. The system according to claim 13, wherein the UMM is further configured to communicate information to security personnel or law enforcement officials which identifies the individual or a vehicle which is being followed thereby.

23. The system according to claim 13, wherein the object is a vehicle.

24. The method according to claim 1, wherein the UMM is further configured to use a non-lethal weapon to mitigate the unusual activity.

25. A Loss Prevention System ("LPS"), comprising:
a processor; and
a non-transitory computer-readable storage medium comprising programming instructions that are configured to cause the processor to implement a method for unusual activity mitigation, wherein the programming instructions comprise instructions to:
detect an unusual activity by at least one individual in a facility;
cause an operational state change by a remote Unmanned Mobile Machine ("UMM") in response to the detection of the unusual activity so that the UMM
visibly follows an individual outside of the facility who is associated ith the unusual activity detected inside the facility, and
coupling a tracking device to an object in the possession of the individual to facilitate a continued tracking of the individual once the individual leaves the facility's premises.

26. The LPS of claim 25, wherein the operational state change comprises transitioning an operational state of the remote UMM from a first operational state in which at least mitigation operations are disabled to a second operational state in which the mitigation operations are enabled, the mitigation operations comprising operations to visibly follow the individual associated with the unusual activity.

27. An Unmanned Mobile Machine ("UMM"), comprising:
a processor; and
a non-transitory computer-readable storage medium comprising programming instructions that are configured to cause the processor to implement a method for unusual activity mitigation, wherein the programming instructions comprise instructions to:
receive a command signal for changing the UMM's operational state that was sent from an external device in response to a detection of an unusual activity by at least one individual in a facility;
in response to the command signal, transition the UMM's operational state from a first state in which at least mitigation operations are disabled to a second state in which the mitigation operations are enabled;
cause the UMM to visibly follow an individual associated with the unusual activity in accordance with the mitigation operations; and
cause the UMM to couple a tracking device to an object in the possession of the individual to facilitate a continued tracking of the individual once the individual leaves the facility's premises.

* * * * *